Figure 3:
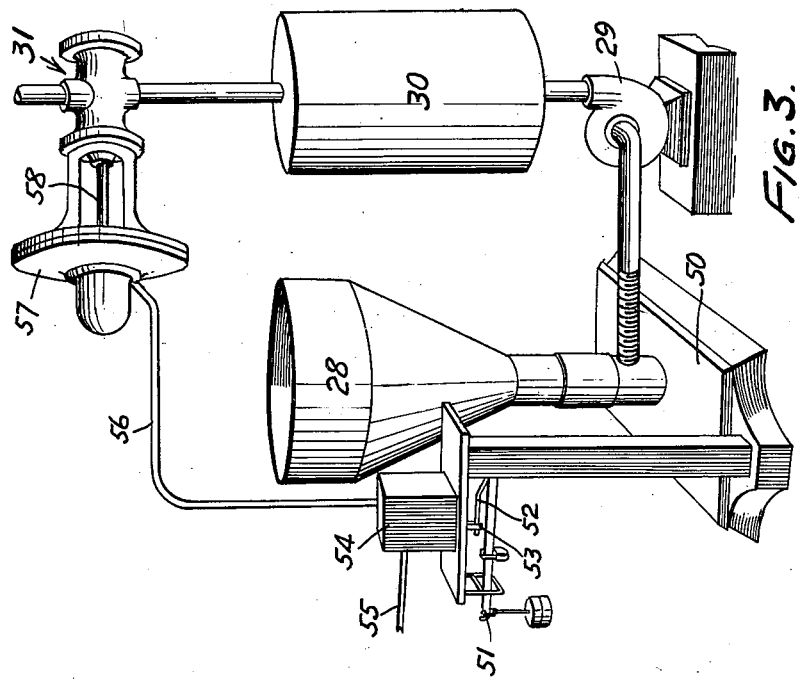

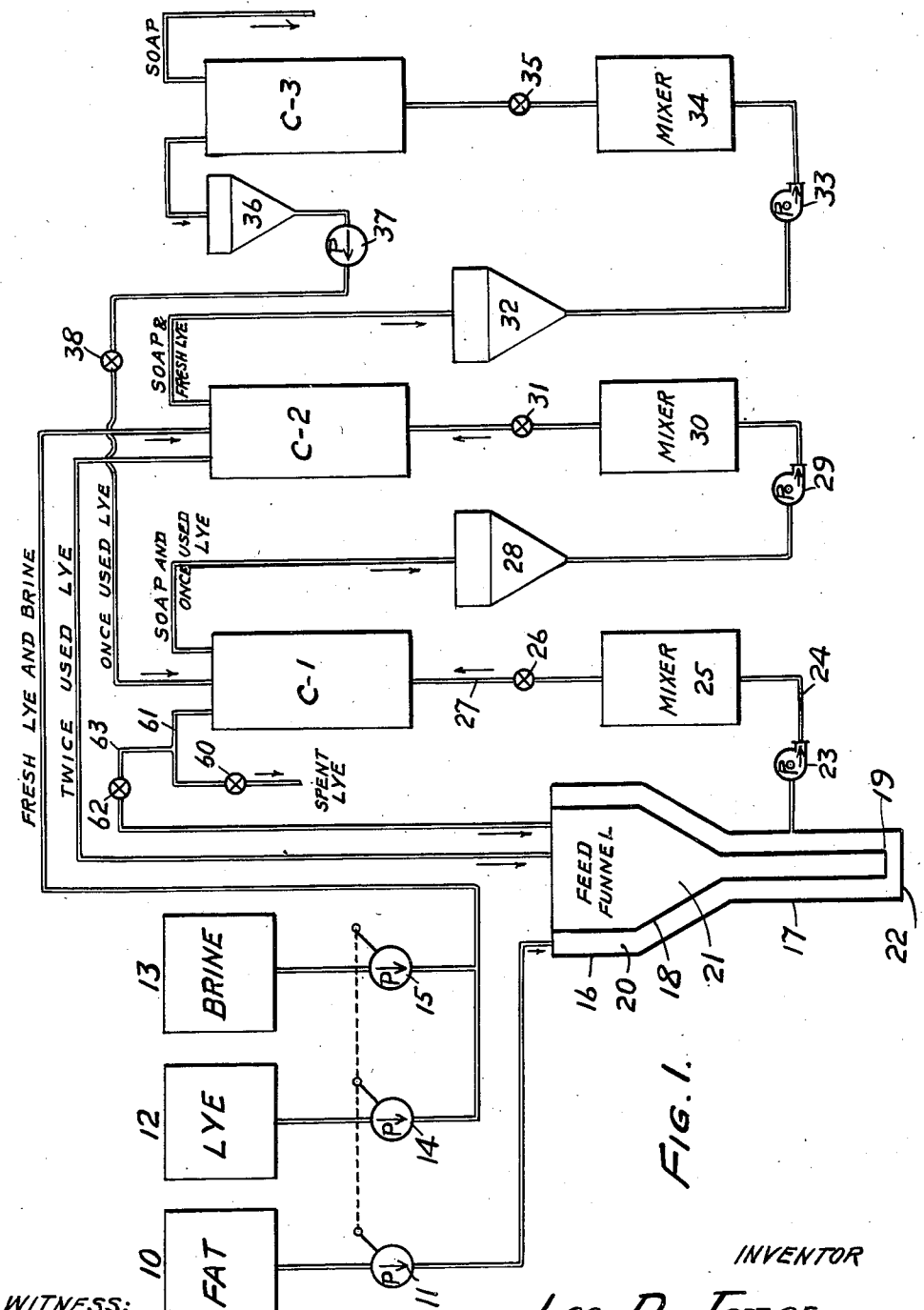

March 7, 1950  L. D. JONES  2,499,388
PROPORTIONATE FEEDING AND TREATING SYSTEM
Filed July 22, 1943  2 Sheets-Sheet 2

WITNESS:

INVENTOR
Leo D. Jones
BY
Maurice A. Crewe
ATTORNEY

Patented Mar. 7, 1950

2,499,388

UNITED STATES PATENT OFFICE 2,499,388

PROPORTIONATE FEEDING AND TREATING SYSTEM

Leo D. Jones, Philadelphia, Pa., assignor to The Sharples Corporation, a corporation of Delaware Application July 22, 1943, Serial No. 495,707

8 Claims. (Cl. 260—417)

The present invention pertains to a countercurrent treating and separating system and process and is concerned with problems of feeding and proportioning materials passed through such a system continuously. In the simplest form of such a system, involving but two stages, the material to be treated is first fed into confluence and mixed with a stream of treating agent which is carefully proportioned with respect to the flow of the material to be treated. The treating agent is next separated from the once-treated product of the first stage and discharged from the system.

The product of the separation of the first stage is next treated with fresh treating agent and separated therefrom in the second stage of treatment, the treating agent separated in this stage being then used in treatment of fresh material in the first stage, as described above.

As is well understood by those skilled in the art, in a three-stage countercurrent process, fresh material is first treated with twice-used treating agent, the separated product of the first stage then treated with one-used treating agent, and the separated product of the second stage is then treated with fresh treating agent. The general principle involved may be extended to treatment in any number of stages desired.

When the counter-treating principle is performed in a plurality of batch operations, the proper control of the ratio of treating agent to the material to be treated may be accomplished by simple measurement or weighing. When the process involves continuous counter flow through a plurality of stages of treating and separation, on the other hand, it is necessary to provide proportioning devices including pumps and/or meters of special design for insuring that the proper proportionate continuous flow will be maintained in all stages. Such proportioning devices are relatively expensive, and in the prior art separate proportioning devices of this character have been provided for each successive stage of the treatment.

In the present invention, the expense of providing separate proportioning devices for each stage is avoided by providing positive proportionate feed of material to be treated and treating agent only to the first and final stages of the treating system, respectively, and by providing a special arrangement for obtaining flow in the intermediate stages which is equal (or proportionate—both with respect to treating agent and with respect to product to be treated) to the rate of discharge of these respective substances from the stage from which they are derived. As an illustration of a system involving application of the principle of the invention, it will be helpful to consider a three-stage system involving that principle. In such a system, accurate proportioning devices such as proportioning pumps or a combination of pump and meter such as that illustrated in Jones Patent 2,009,890 control flow of treating agent to the third stage and material to be treated to the first stage in such ratio as to effect exactly the desired treatment in the three counter-current stages. Once-used treating agent from the third stage will be passed to the treating step of the second stage and the separated product of the treatment of the first stage will also be passed to the treating step of the second stage, into confluence with the treating agent from the third stage. Since the quantity of product and treating agent discharged from each stage is dependent upon the quantity of material to be treated and treating agent passed to the first and third stages, respectively, the ratio of product of treating agent passed from the first and third stages, respectively, to and through the second-stage treatment will not vary so long as there is no change in the ratio of material to treating agent passed to the system, and so long as the treating agent and material are passed to the treatment of the second stage at the same rates (or a fixed proportion thereto) as the rates of discharge thereof from the third and first stages, respectively.

It is desirable that the material under treatment and treating agent be positively impelled, preferably by pump pressure, through the mixers or other similar elements of apparatus involved in the various stages of treatment. In order to provide a constant supply of material for feed by the pumps of the intermediate stages through the mixers of those stages, it is necessary that a reservoir of material be built up for supply to the pumps of the respective stages. But if the quantity of material in such reservoirs be allowed to fluctuate substantially during the course of the operation, the rate of feed of product to be treated and of treating agent will not be equal or proportionate to the rate of passage of these respective substances from the respective stages from which they are derived. An important feature of the invention accordingly involves an arrangement, involving in the particular embodiment illustrated, a combination of receptacles, pumps, valves and control elements, by which a constant and predetermined amount of the product and treating agent may be maintained in passage to and through each successive stage of treatment from the preceding and succeeding stages.

In a three-stage process, such as we have been discussing for purposes of illustration, and in which provision is made as discussed above for maintaining a predetermined quantity of the product from the first stage and the treating agent from the third stage passing to and through the second stage, the ratio of product passing through the second stage to treating agent passing through that stage will accordingly be predetermined just as definitely as though positive proportioning pumps were provided for feeding the product from the first stage and the treating agent from the third stage to this intermediate stage.

The invention also provides means, in connection with a three-stage system, for maintaining a predetermined quantity of treating agent from the second stage passing to and through the treatment of the first stage, in order to effect accurate proportioning of this treating agent to material being positively proportioned for treatment in the first stage, and it provides means for maintaining a predetermined quantity of material passing to and through the third stage from the second stage to effect accurate proportioning of that material with respect to treating agent positively proportioned to the third stage.

In case only two stages are employed, or in case four or more stages are employed, the same principles discussed above as applicable to a three-stage system will be used in practice of the invention. Thus, in the case of a two-stage system it is only necessary to proportion the quantity of material to be treated entering the first stage to the quantity of treating agent entering the second stage, and to maintain the rate of flow of treating agent passing from the separating step of the second stage to and through the treating step of the first stage equal or proportionate to the rate of discharge of treating agent from the second stage, while maintaining the rate of passage of product from the first stage to and through the second stage equal or proportionate to the rate of discharge of said product from the first stage. The fundamental feature involves proportioning treating agent and material to be treated to the last and first stages, respectively, and insuring intra-stage flow of treating agent and material at the same (or proportionate) rates as (or to) inter-stage delivery of these substances from the stages from which they are derived.

As noted above, the present invention provides means for maintaining a predetermined quantity of material in a receptacle through which said material is passed during flow through the stages of a multi-stage counter-current continuous process. A particular feature of the invention consists in the fact that this control is effected by control of valves through which the material is pumped when the valves are open, and that the operation of these valves is controlled as a function of the weight of the material in the receptacles designed to maintain a constant quantity of material therein. In the preferred form of the invention, the operation of these valves is controlled by fluid pressure such as compressed air, and very delicate control is attained in response to variations in weight of the inter-stage material.

The present invention was conceived as a solution of problems involved in the manufacture of soap continuously by saponification of fat as described in the prior patents to Scott 2,300,749 and 2,300,750 and the prior patent to Scott and Sender 2,300,751. It will accordingly be discussed with reference to a situation in which the material to be treated is a saponifiable fat and the treating agent is a saponifying solution. It is to be understood that this method of description is adopted solely for the purpose of facilitating understanding of the invention by reference to specific materials, and not by way of limitation.

Figure 2:
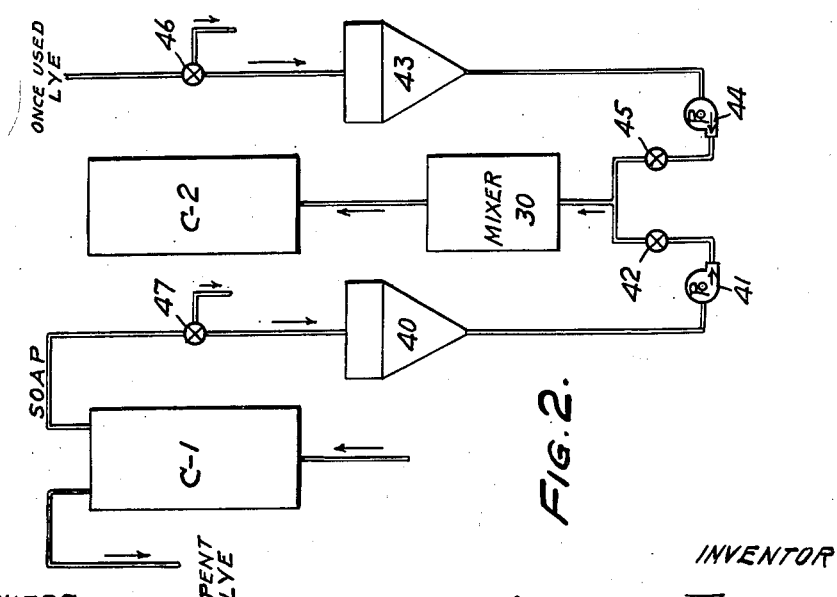

Further features and advantages of the invention will be evident from a reading of the following detailed description in connection with the attached drawing, in which Figure 1 is a flow sheet illustrating a preferred form of the invention as applied in a three-stage counter-current saponifying process for the manufacture of soap, Figure 2 is a similar flow sheet of a portion of the apparatus, illustrating a modification, and Figure 3 is a perspective view of the mechanism for controlling intra-stage flow.

Referring to the embodiment of the invention illustrated in Figure 1, the fat to be saponified is pumped from container 10 by pump 11, and lye and brine are simultaneously pumped from containers 12 and 13, respectively, by pumps 14 and 15, respectively. The pumps 11, 14 and 15 are intercontrolled in a manner familiar in the art of proportioning to provide control of the relative proportions of fat, lye and brine fed into the treating system thereby. The fat is fed to the first treating stage of the process, while the fresh lye and brine are fed to the third treating stage, as illustrated.

The feed of fat to the first stage is accomplished by passage thereof into the space 20 between an outer feed funnel 16 and an inner feed funnel 18 of a double feed funnel or reservoir 17, while saponifying reagent for this stage is fed from the separating step of the second stage of the process into the space 21 within the inner feed funnel 18. The outer feed funnel 16 is closed at its lower end as indicated at 22, and the inner feed funnel 18 terminates at 19, short of the end 22, thus providing a space for flow of saponifying reagent around the lower edge 19 and from the bottom of the inner feed funnel outwardly and upwardly into the lower part of the outer feed funnel. The arrangement for controlling the amount of materials in the inner and outer feed funnels and for similarly controlling the amounts in the other feed funnels of the invention will be described hereinafter. For our present purposes it is only necessary to explain that fat from the upper part of the space 20 between the feed funnels and lye from the lower part of this space are pumped together by centrifugal pump 23 through conduit 24 and mixer 25, where the saponifying reaction of the first stage principally occurs.

After leaving the saponifying mixer 25, the mixture passes through a valve 26 in a conduit 27 to a centrifuge C—1 (preferably of the liquid balance type). The operation of the valve 26 is controlled by the quantity of material in the double feed funnel or reservoir 17, as will be described hereinafter. The spent saponifying reagent is separated from the largely saponified soap phase in this centrifugal, and the separated saponifying reagent (spent lye) may be removed thence from the system through valve 60 of conduit 61.

In order to assist in discharge of soap of the (largely) saponified mass separated from saponifying reagent in centrifuge C—1, the saponifying reagent for the second stage of the reaction may be introduced directly into the soap-receiving cover of centrifuge C—1 to flush the discharged saponified mass from that cover. This second stage saponifying reagent may be once-used lye derived from the third stage separation, as illustrated. The mixture thus discharged from the centrifuge cover of the first stage is next passed through mixing and separating steps of the second stage to effect further reaction between saponifying reagent and saponifiable constitutents, and a further separation. As illustrated, this mixture is first passed to a feed funnel or reservoir 28, and is thence pumped by pump 29 through mixer 30 and valve 31 to effect the saponification reaction of the second stage. The operation of the valve 31 is controlled to maintain a constant quantity of material in reservoir 28 in normal operation, as described hereinafter. The mixture next passes to the centrifuge C—2 of the second stage, the saponifying reagent (twice-used lye) of this centrifugation being passed into the inner feed funnel 18 to accomplish the saponification of the first stage, as described heretofore.

In a three-stage counter-current saponification process as illustrated, the fresh saponifying reagent is introduced into the third stage of the process and the fresh lye and brine from pumps 14 and 15 are accordingly introduced into the soap-receiving cover of centrifuge C—2 to assist in discharge of soap from that cover and effect the desired saponifying and graining steps in the ensuing third stage. The resulting mixture is then passed through a feed funnel or reservoir 32 to a pump 33 and is thence pumped through mixer 34 and valve 35 to centrifuge C—3, these parts corresponding in structure and function to parts 28, 29, 30, 31 and C—2 of the flow sheet. An aqueous liquid may be used to assist in discharge of soap from the soap-receiving cover of centrifuge C—3, if desired, and this saponified material may next be subjected to fitting or any other appropriate treating step.

The saponifying reagent (once-used lye) discharged from centrifuge C—3 is next pumped into confluence with saponified material discharged from the first stage, in order to effect the saponifying reaction of the second stage. As illustrated (and mentioned hereinabove), this once-used lye may be introduced directly into the soap-receiving cover of centrifuge C—1 to assist in discharging soap therefrom prior to performance of its saponifying function. In order to maintain a constant supply of saponifying reagent for feed to the second stage of the process (the soap-receiving cover of centrifuge C—1), the reagent is passed to a reservoir or funnel 36, and is pumped thence by pump 37 through valve 38 to the soap-receiving cover of centrifuge C—1. The operation of valve 38 is controlled by the quantity of material in reservoir 36 to maintain a constant quantity of that material (lye) in the reservoir and hence effect feed of the lye to the cover of centrifuge C—1 at the same rate as the rate of discharge of lye from centrifuge C—3.

During normal operation of the system as described above, a quantity of reagent will be maintained in space 21 of funnel 18 and in funnel 36, a quantity of the saponified mass from centrifuge C—1 and reagent introduced into the cover of that centrifuge will be maintained in funnel 28, a quantity of saponified mass from centrifuge C—2 and reagent introduced into the cover of that centrifuge will be maintained in funnel 32 and a quantity of unsaponified fat will be maintained in the space 20 between funnels 16 and 18.

Since the weight-controlled mechanisms control operation of valves 26, 31, 35 and 38 the pumps 23, 29, 33 and 37 will not effect feed of material through mixer 25, to the cover of centrifuge C—1, or through mixers 30 and 34 until feed of further materials to these respective funnels, after these funnels contain predetermined quantities of these materials, as described hereinafter in connection with the control mechanisms for the respective funnels.

Assuming that these predetermined quantities are present in the respective funnels, as further fat is fed by pump 11 to space 20 and further lye and brine to the soap-receiving cover of centrifuge C—2 and thence to funnel 32, the valve 26 will be operated to allow the mixture from funnels 16 and 18 to flow through mixer 25 to centrifuge C—1 and the valve 35 will be operated to allow the mixture from funnel 32 to flow through mixer 34 to centrifuge C—3. The discharge of reagent from centrifuge C—3 into funnel 36 as material is passed from mixer 34 to centrifuge C—3 will actuate valve 38 to permit reagent to be pumped by pump 37 to the soap-receiving cover of centrifuge C—1, thus flushing from that cover into funnel 28 soap discharged concurrently from centrifuge C—1 which has been pumped thereto by pump 23. As this mixture is passed to funnel 28, the valve 31 will be opened, thereby permitting the pump 29 to impel mixture from mixer 30 into centrifuge C—2. The reagent (twice-used lye) from this centrifuge will be passed to space 21 to effect saponification of further fat as such fat is passed by pump 11 to space 20 and thence, together with the reagent, to the mixer 25.

From the above discussion, it will be evident that, as further fat and reagent are positively and continuously proportioned to the first and third stages, respectively, the flow of materials through the three counter-current treating stages as described above will be continuous. Since both the ratio and strength of the reagent are controlled, and since the flow from stage to stage is exactly equal to the discharge from the stages from which the materials are derived, the treatment is maintained uniform so long as the ratio and strength of reagent are maintained uniform, and the nature and proportions of the respective materials entering every stage are predetermined by the controls described above. Since predetermined quantities of materials are always maintained in the respective funnels during continuous operation, a supply will always be available for feed by the respective pumps through the steps of the process, after normal operation has once been established. Adequate control of the operation may be maintained by adjustment of the ratio of reagent to fat or of the strength of reagent from time to time, as chemical analysis or other factors may dictate.

In the above description of the apparatus and the process of the invention as illustrated in Figure 1 of the drawing, we have considered the invention in a preferred embodiment involving mixing of reagent from the third stage with saponified material discharged from the first stage before passing these materials to the reservoir 28 from which they pass through the treating steps of the second stage of the process, and we have similarly described mixing fresh saponifying reageant with the saponified mass discharged from the second stage before passing these materials to the reservoir 32 from which they pass through the treating steps of the third stage of the process. This feature of pre-mixing materials before passing them to the respective reservoirs is useful in connection with a process in which viscous material such as the saponified mass treated in these steps is to be treated, since it consists in flow of the saponified mass from the centrifugal covers and to the reservoirs. It is also valuable because of the fact that it minimizes the amount of equipment required. It is not always vital even in connection with a soap-making process, however, and in the treatment of less viscous materials it is unnecessary.

Figure 2 of the drawing illustrates an alternative embodiment in which the saponified mass and reagent are passed through separate flow-controlling equipment into confluence with each other, and the type of equipment illustrated in this figure may be used in connection with each of the separate counter-current treating steps of the process if desired. As there illustrated, soap from the centrifuge C—1 is passed to a funnel or reservoir 40 which is controlled in the same manner as the funnels or reservoirs 28, 32 and 36 to maintain a constant quantity of saponified material therein during normal operation. The saponified mass from the funnel 40 is passed by a pump 41 through the valve 42 to mixer 30, and this valve 42 is controlled by the quantity of material in the funnel 40 in the same manner that the valve 31 of Figure 1 of the drawing is controlled by the quantity of material in the funnel 28. A funnel 43 receives saponifying reagent from the centrifuge C—3 and this saponifying reagent is pumped by pump 44 through valve 45 to mixer 30, the valve 45 being controlled by the quantity of material in the funnel 43 in the same manner as discussed above with respect to control of the various valves 26, 31, 35, 38 and 42 by the quantity of material in the funnels preceding these respective valves in the flow lines. Thus, in the embodiment of Figure 2, the proportioning of the saponified mass and saponifying reagent for flow through the mixer 30 to the centrifuge C—2 is controlled by separate funnels and valves, these materials being mixed with each other beyond the zone of flow control.

The reagent and saponified mass passing to the funnels 43 and 40, respectively, of Figure 2 of the drawing may be passed to these funnels through proportioning valves 46 and 47, respectively, and any desired proportion of either of these constituents may thus be diverted from the treating steps of the embodiment of Figure 2 by proper adjustment of these valves. Thus, in case it is desired to use less reagent in the second stage of the process than that discharged from the third stage of the process, a constant proportion of this reagent may be removed from the system or at least from the treating step of the second stage by proper adjustment of the valve 46. Similar proportioning valves may be employed in connection with the embodiment of Figure 1 of the drawing, these valves being arranged between the zones of discharge of the reagent from the respective centrifuges and respective points in the flow system of Figure 1 at which these reagents are introduced into confluence with the saponified masses for treatment in accordance with the flow sheet of that figure. By diverting from the system any fixed proportion of the reagent which is not desired for treatment in the next stage to which the reagent is passed in counter-flow, it is possible to effect uniform treatment in such subsequent stage by any desired proportion of such reagent.

As a further alternative, a double feed funnel arrangement such as that illustrated for feed of fat and saponifying reagent to the first stage of the process may be substituted for feeding and controlling arrangements of the subsequent stages.

Figure 3 of the drawing illustrates the weight-controlled mechanism by which feed of material from the funnel 28 by pump 29 through the mixer 30 and valve 31 is accomplished. The funnel 28 is supported upon the platform 50 of a scale, downward movement of this platform being opposed by weights upon the beam arm 51 of that scale. A lever 52 is connected to the beam arm for movement therewith, and this lever is, in turn, connected with a link 53 which controls the operation of an air valve in the housing 54. The operation of this valve controls flow of air from a supply source 55 through a conduit 56 to a diaphragm motor 57, this diaphragm motor serving to operate the actuating rod 58 of valve 31 in a manner substantially similar to control of valve 7 of Bristol Patent 1,405,181.

In operation, as liquid is fed to the funnel 28, during operation of the pump 29, this liquid is passed into mixer 30 until that mixer is filled, and thence to valve 31, which remains closed during this stage of the operation, due to passage of air from the source 55 through the housing 54 and conduit 56 to the diaphragm motor 57. As flow of liquid to the funnel 28 continues after the mixer 30 and feed conduits between funnel 28 and mixer 30 are filled, the level of liquid in the funnel 28 will continue to rise until the weight of that liquid causes the beam arm 51 to rise, and effect throttling or closing of the air supply valve in housing 54, through the operation of lever 52 and link 53. This will reduce or cut-off flow of air to the diaphragm motor 57, with the result that the valve 31 will be opened by spring actuation, and liquid will flow through the valve 31 to the centrifuge C—2. The level of liquid in the funnel 28 will ascend or descend at this stage of the operation, depending upon whether the rate of discharge through the valve 31 is less than or exceeds the rate of feed to the reservoir or funnel 28. The pump 29 and valve 31 have a flow capacity greater than the normal rate of feed to the funnel 28, and consequently the rate of discharge of the material through the valve 31 will exceed the rate of feed to the funnel 28 if the valve 31 is fully opened. By throttling of the valve 31 or successive opening and closing of that valve, the quantity of liquid in receptacle or funnel 28 will thus be maintained substantially constant during continued operation.

The weight-controlled mechanism is preferably designed in such manner that gradual throttling of the air valve in the housing 54 occurs as the beam arm 51 ascends, thereby partially opening valve 31 to a steadily increasing degree until the rate of discharge of liquid through that valve exactly equals the rate of feed of material to the funnel or reservoir 28. By providing sensitive equipment designed in this manner, sudden flow fluctuations are avoided with consequent improvement in efficiency of centrifugation.

The valves 35 and 38 are controlled by weight-controlled mechanism associated with the funnels 32 and 36, respectively, in exactly the same manner described above with respect to control of the valve 31.

The control of the valve 26 is accomplished by a weight-controlled mechanism identical in principle with that described above with respect to control of the valve 31. In this instance, the entire double funnel assembly 17 including the funnels 16 and 18, is mounted upon the platform of a scale, and the beam of this scale operates to effect opening of the valve 26 when the sum of the weights of the materials in the funnels 16 and 18 exceeds a predetermined amount. The weight-controlled mechanism by which this is accomplished is adjusted for a normal operation which will cause the valve 26 to be closed unless a substantial quantity of fat and lye is present in the double feed funnel assembly 17.

In starting up the system with fresh fat and lye, assuming that no fat, soap, or lye is present in any part of the system beyond the containers 10, 12 and 13, a sufficient quantity of brine is first poured into the funnel 18 to fill the mixer 25 and the system up to the level of the valve 26. Brine will then occupy the space 20 within the outer feed funnel 16, as well as the space 21 within the inner feed funnel 18. The proportioning pumps 11, 14 and 15, and the pumps 23, 29, 33 and 37 are now started, with the result that fat will be fed by the pump 11 into the space 20 between feed funnels 16 and 18, and the lye-brine solution will be fed into the cover of the centrifuge C—2. As fat is fed to the space 20, the weight of materials in the funnels 16—18 will become sufficient to cause opening of the valve 26, with the result that the brine previously in the mixer 25 and the lower portion of the funnels 16 and 18 will be displaced and discharged from the centrifuge C—1 through the spent lye outlet from that centrifuge, and fat will gradually descend through the space 20 until it reaches the level of the conduit through which this fat flows to the pump 23. In the meantime, the lye and brine solution proportioned to the flow of the fat and fed to the cover of the centrifuge C—2 will pass through funnel 32, pump 33, mixer 34, valve 35, centrifuge C—3, funnel 36, pump 37, valve 38, the cover of centrifuge C—1, funnel 28, pump 29, mixer 30, valve 31 and centrifuge C—2, to the space 21 within the inner feed funnel 18. As this lye-brine solution continues to accumulate within the space 21, it will ultimately pass around the lower edge 19 of the funnel 18 and ascend to the level of the conduit through which materials are drawn by the pump 23. After the stage of operation is reached at which lye (lye-brine solution) and fat are drawn simultaneously through conduit 24, a mixture of fat and lye in the desired proportion will be continuously impelled by the pump 23 through conduit 24 and mixer 25 to valve 26, the rate of feed of this mixture through the valve 26 being substantially the same at all times as the combined rate of feed of fat and lye to the spaces 20 and 21, respectively.

Saponification will occur in the mixer 25, and spent lye will be separated from the soap in centrifuge C—1. Soap is flushed from the cover of the centrifuge C—1 by lye injected into that cover through valve 38 from pump 37, and the mixture of soap and lye so produced will be passed to funnel 28. Flow of this mixture through that funnel will then be accomplished by the weight-control mechanism described above in connection with Figure 3 of the drawing. From the above description of the operation of the flow-controlling elements of the first two stages of the process, the operation of the second and third stages will be self-evident.

When the operator desires to shut down the operation of the system described above, he first stops the proportioning pumps 11, 14 and 15 and pump 37. Flow of material from the respective feed funnels will thus be stopped promptly due to the automatic operation of the valves 26, 31, etc., upon decrease in the weight of material in the respective feed funnels. The balancing weights associated with the feed funnels 16 and 18 are then adjusted to a position in which the valve 26 is maintained open during flow of fat and lye from the funnels 16 and 18 until no further fat remains in the space 20. During the normal operation of the system, the valve 60 in the conduit 61 through which lye is discharged from the centrifuge C—1 will be maintained open, with the result that this lye will be fed to a suitable receptacle for glycerine recovery. In operation preliminarily to shutting down the system as discussed above, however, valve 60 will be closed, and valve 62 in conduit 63 will be opened, with the result that spent lye from centrifuge C—1 will be fed into feed funnel 21, and will pass from that feed funnel through pump 23, conduit 24 and mixer 25, thereby flushing soap from this portion of the system. This recycling of lye will be continued until all of the soap in the first stage of the process has thus been flushed from the mixer 25 and passed through centrifuge C—1 into feed funnel 28. The first stage will then be cleansed of soap. By employing an operation in which the reagent solution is recycled in the manner discussed above in flushing soap from the system, saponification of the soap proceeds during flow of the soap through the mixers 25, 30 and 34, with the result that the soap discharged from centrifuge C—3 during this flushing operation is a fully saponified material.

The flushing of soap from the apparatus of the second and third stages of the process takes place simultaneously with the flushing of soap from the first stage of the process as discussed above. Thus, during the operation of the pump 23 to recycle lye-brine solution through mixer 25, centrifuge C—1 and feed funnel 21 in flushing soap from the mixer 25 and centrifuge C—1 into feed funnel 28, the pumps 29 and 33 are operated to cause flow of soap discharged into feed funnel 28 through mixer 30, centrifuge C—2, feed funnel 32, mixer 34 and centrifuge C—3 from the second and third stages of the process. At the same time, the lye-brine solution discharged from centrifuge C—2 is diverted into the cover of centrifuge C—1, instead of being passed to feed funnel 21 as in normal operation, and the lye-brine solution from centrifuge C—3 is diverted to the cover of centrifuge C—2 instead of being passed to the cover of centrifuge C—1 as in normal operation. Lye-brine solution discharged from centrifuge C—2 will thus be recycled through the cover of centrifuge C—1 in the second stage of the process until all of the soap has been flushed from that stage of the process into the feed funnel 32, and lye-brine solution from centrifuge C—3 will be recycled through the cover of centrifuge C—2 and the third stage of the process until all of the soap has been displaced from that stage of the process and from the centrifuge C—3. The weights controlling flow of material through valves 31 and 35 are adjusted during the flushing-out process to leave but a small quantity of reagent in funnels 28 and 32 at the end of the flushing-out operation. After all of the soap from all three stages has been flushed out and discharged from centrifuge C—3, the pumps and centrifuges will be shut down.

When this stage of the operation has been reached, spent lye-brine solution will be present in both branches of the feed funnel 17 and in the mixer 25, twice used lye-brine solution will be present in the feed funnel 28 and mixer 30, and once used lye-brine solution will be present in the feed funnel 32 and mixer 34. The presence of these reagent solutions in the respective mixers and feed funnels is useful in connection with restarting the system when operation is resumed, as will be evident from the following description of the operation of re-starting.

When operation of the system is to be resumed after shutting down, the pumps 11, 14, 15, 23, 29, 33 and 37, as well as the centrifuges C—1, C—2 and C—3 are started, after opening of the valve 60, closing of the valve 62, and restoration of valves controlling the flow of lye from the respective stages of the process to the portions of the system indicated by the flow diagram of Figure 1, and adjustment of the weight control elements to their normal operative positions. Fresh lye and brine fed by pumps 14 and 15 to the cover of centrifuge C—2 will be discharged into weight control member 32 and accumulate in that member until a sufficient weight is present to cause opening of valve 35, whereupon the material in the funnel 32 and mixer 34 will be passed through centrifuge C—3 to weight control member 36. Upon flow of reagent solution to weight control member 36 the valve 38 will be opened and the lye from that weight control member will be injected into the cover of centrifuge C—1. This lye injected into centrifuge C—1 will flow into weight control member 28 and thence in similar manner through mixer 30 and centrifuge C—2, from which it will flow into the space 21 within inner feed funnel 18. At the same time, fat will flow from container 10 into the space 20 within outer feed funnel 16 and gradually displace spent lye-brine solution upwardly from that feed funnel into the space 21 within inner feed funnel 18. As the twice used lye from centrifuge C—2 accumulates in the space 21 within feed funnel 18, the weight of material in the double feed funnel member 17 will ultimately become sufficient to cause the valve 26 to be opened and liquid to flow through that valve to centrifuge C—1. This liquid, which is the spent reagent solution, will flow through valve 60 and be discharged thence from the system. After discharge of this spent reagent, fat from space 20 within outer feed funnel 16 and lye from space 21 within inner feed funnel 18 will be passed together through pump 23, mixer 25 and centrifuge C—1, with the result that the spent lye resulting from treatment of the fat in mixer 25 will be discharged through valve 60 from the system, while the soap will be discharged into feed funnel 28. When this stage of the process has been reached, and flow of reagent into the various centrifuge covers has been established as described above, the saponification steps will be accomplished by counter-current operation, as described above in connection with initial starting up of the system.

By employing the above-described sequence of steps of flushing soap from the system upon shutting down and upon starting the system in operation again, the fat and partially saponified products treated in the various stages of the process are subjected to treatment, upon starting up again, with reagents of the same strength as are used in the various stages of the system during normal continuous counter-current operation.

Various modifications are possible within the scope of the invention, and I do not therefore wish to be limited except by the scope of the following claims.

I claim:

1. In a multi-stage continuous system for the treatment with a treating phase of a phase to be treated wherein said phases are fed to said system in separate streams wherein said phases are in each of said stages intimately mixed and then separated and wherein said phases in separate streams progress from stage to stage, the improvement which comprises means for maintaining continuous the flow of a phase to a stage, said flow being continuous irrespective of the rate of said flow, said means comprising a receptacle, means for directing said flow of said phase to said stage into said receptacle, means for pumping said phase from said receptacle to said stage, a valve for controlling the rate of flow of said phase from said receptacle, and means responsive to the quantity of material in said receptacle for operating said valve to increase and decrease the rate of said flow of said phase from said receptacle with increase and decrease in the quantity of material in said receptacle.

2. In a multi-stage continuous system for the treatment with a treating phase of a phase to be treated wherein said phases are fed to opposite ends of said system in separate streams wherein said phases are in each of said stages intimately mixed and then separated and wherein said phases in separate streams progress from stage to stage in opposite directions, the improvement which comprises means for maintaining continuous the flow to one of said stages of said phases in admixture, said means comprising a receptacle, means for directing the streams of said phases flowing to said stage into said receptacle, means for pumping said phases in admixture from said receptacle to said stage, a valve for controlling the rate of flow of said admixture from said receptacle, and means responsive to the quantity of material in said receptacle for operating said valve to increase and decrease the rate of said flow of said phase from said receptacle with increase and decrease in the quantity of material in said receptacle.

3. The combination with a multi-stage system for the treatment with a treating phase of a phase to be treated and which system comprises at least three separate stage means for mixing and then separating streams of said phases, means for feeding the respective phases to opposite ends of said system in separate streams, and means for causing the respective streams of said phases to progress from stage to stage in opposite directions, of means for regulating the flow of said phases to an intermediate stage, said last-mentioned means comprising a receptacle, means for delivering the flow of said phases to said intermediate stage to said receptacle, means for pumping said phases in admixture from said receptacle to said intermediate stage, a valve for regulating the flow of said admixture from said receptacle, and means actuated by the weight of material in said receptacle for operating said valve to increase and decrease the rate of flow of said admixture from said receptacle with increase and decrease in the weight of material in said receptacle, whereby continuous flow of said admixture to said intermediate stage is assured.

4. The combination with a multi-stage system for the treatment with a treating phase of a phase to be treated and which system comprises a plurality of separate stage means for mixing and then separating streams of said phases, means for feeding the respective phases to opposite ends of said system in separate streams, and means for causing the respective streams of said phases to progress from stage to stage in opposite directions, of means for each stage for regulating the flow of said phases to said stage, said last-mentioned means comprising a receptacle, means for delivering the flow of said phases to said stage to said receptacle, means for pumping said phases in admixture from said receptacle to said stage, a valve for regulating the flow of said admixture from said receptacle, and means actuated by the quantity of material in said receptacle for operating said valve to increase and decrease the rate of flow of said admixture from said receptacle with increase and decrease in the quantity of material in said receptacle, whereby continuous flow of said admixture to said stage is assured.

5. The combination with a multi-stage system for the treatment of a phase containing a saponifiable fat with a phase containing a saponifying agent and a graining agent for the production of soap and which system comprises at least three separate stage means for mixing and then separating streams of said phases, means for feeding the respective phases to opposite ends of said system in separate streams, and means for causing the respective streams of said phases to progress from stage to stage in opposite directions, of means for each intermediate stage for regulating the flow of said phases to said stage, said last-mentioned means comprising a receptacle, means for delivering the flow of said phases to said stage to said receptacle, means for pumping said phases in admixture from said receptacle to said stage, a valve for regulating the flow of said admixture from said receptacle, and means actuated by the weight of material in said receptacle for operating said valve to increase and decrease the rate of flow of said admixture from said receptacle with increase and decrease in the weight of material in said receptacle, whereby continuous flow of said admixture to said stage is assured.

6. The combination with a multi-stage system for the treatment of a phase containing saponifiable fat with a phase containing a saponifying agent and a graining agent for the production of soap and which system comprises at least three separate stage means for mixing and then separating streams of said phases, each said separate stage means comprising a mechanical mixer and a centrifugal separator connected in series, means for feeding the respective phases to opposite ends of said system in separate streams, and means for causing the respective streams of said phases to progress from stage to stage in opposite directions, of means for each intermediate stage for regulating the flow of said phases to said stage, said last-mentioned means comprising a receptacle, means for delivering the flow of said phases to said stage to said receptacle, means for pumping said phases in admixture from said receptacle to said stage, a valve for regulating the flow of said admixture from said receptacle, and means actuated by the quantity of material in said receptacle for operating said valve to increase and decrease the rate of flow of said admixture from said receptacle with increase and decrease in the quantity of material in said receptacle, whereby continuous flow of said admixture to said stage is assured.

7. In a process for the treatment with a treating phase of a phase containing a saponifying agent and a graining agent containing saponifiable fat for the production of soap wherein said phases are fed to opposite ends of a multi-stage continuous system in separate streams wherein said phrases are in each of said stages intimately mixed and then separated and wherein said phases in separated state and in separate streams progress from stage to stage in opposite directions, steps for maintaining continuous the flow of a phase to a stage, said flow being continuous irrespective of the rate of said flow, said steps comprising directing said flow of said phase to said stage into an accumulated body of said phase, pumping a stream of said phase from said body to said stage, and controlling the rate of flow of said phase from said body due to said pumping through the quantity of material in said body to increase and decrease the rate of said flow of said phase from said body with increase and decrease in the quantity of material in said body.

8. In a process for the treatment in a multi-stage system of a phase containing saponifiable fat with a phase containing a saponifying agent and a graining agent for the production of soap, which system comprises at least three separate stages for intimately mixing and then centrifugally separating streams of said phases, and in which system the respective phases are fed to opposite ends of said system in separate streams and progress in separate streams from stage to stage in opposite directions, steps for regulating the flow of said phases to each intermediate stage, said steps for each said intermediate stage comprising delivering the flow of said phases to said intermediate stage to a separate accumulated body of said flow, separately pumping a stream of said phases in admixture from said body to said intermediate stage, and regulating the flow of the admixture from said body due to said pumping through the weight of material in said body to increase and decrease the rate of flow of said admixture from said body with increase and decrease in the weight of material in said body, whereby continuous flow of said admixture to said intermediate stage is assured.

LEO D. JONES.

REFERENCES CITED

The following references are of record in the file of this patent:

UNITED STATES PATENTS

| Number | Name | Date |
| --- | --- | --- |
| 1,666,560 | Edeleneau | Apr. 17, 1928 |
| 2,023,545 | Pummill | Dec. 10, 1935 |
| 2,132,151 | Fenske | Oct. 4, 1938 |
| 2,300,749 | Scott | Nov. 3, 1942 |
| 2,300,750 | Scott | Nov. 3, 1942 |
| 2,300,751 | Scott | Nov. 3, 1942 |
| 2,335,457 | Sender | Nov. 30, 1943 |